(12) United States Patent
Predtechenskiy et al.

(10) Patent No.: US 9,714,348 B2
(45) Date of Patent: Jul. 25, 2017

(54) METHOD FOR PRODUCING NANOSTRUCTURED CARBON MATERIAL BASED ON CARBON BLACK

(71) Applicant: MCD Technologies S.a r.l., Bertrange (LU)

(72) Inventors: Mikhail Rudolfovich Predtechenskiy, Novosibirsk (RU); Stanislav Pavlovich Kozlov, Yuzhno-Sakhalinsk (RU)

(73) Assignee: MCD Technologies S.a r.l., Bertrange (LU)

( * ) Notice: Subject to any disclaimer, the term of this patent is extended or adjusted under 35 U.S.C. 154(b) by 0 days.

(21) Appl. No.: 15/021,953

(22) PCT Filed: Jan. 29, 2014

(86) PCT No.: PCT/RU2014/000070
§ 371 (c)(1),
(2) Date: Mar. 15, 2016

(87) PCT Pub. No.: WO2015/047129
PCT Pub. Date: Apr. 2, 2015

(65) Prior Publication Data
US 2016/0222216 A1 Aug. 4, 2016

(30) Foreign Application Priority Data

Sep. 25, 2013 (RU) ................................ 2013143592

(51) Int. Cl.
| | | |
|---|---|---|
| C01B 31/02 | (2006.01) | |
| C09C 1/56 | (2006.01) | |
| C09C 1/48 | (2006.01) | |
| B82Y 40/00 | (2011.01) | |

(52) U.S. Cl.
CPC ............ *C09C 1/56* (2013.01); *C01B 31/0206* (2013.01); *C01B 31/0226* (2013.01); *C09C 1/48* (2013.01); *B82Y 40/00* (2013.01); *C01P 2004/16* (2013.01)

(58) Field of Classification Search
CPC .................. C01B 31/0226; C01P 2004/16
See application file for complete search history.

(56) References Cited

U.S. PATENT DOCUMENTS

| | | | | |
|---|---|---|---|---|
| 4,995,999 A | * | 2/1991 | Nakada ..................... | C09C 1/50 252/62.51 R |
| 5,891,414 A | | 4/1999 | Kanamaru et al. | |
| 9,550,875 B2 | * | 1/2017 | Wampler ................. | C08K 3/04 |

FOREIGN PATENT DOCUMENTS

SU 850642 A1 7/1981

OTHER PUBLICATIONS

Search report in PCT/RU2014/000070.
Orlov V. Yu. et al., Proizvodstvo i ispolzovanie tekhnicheskogo ugleroda dlya rezin. Yaroslavl, Aleksandr Rutman, 2002, pp. 82-85, 99, 127, 130-132, 164-165, 230, 235, 238.
Ivanovskii V. I., "Tekhnicheskii uglerod. Protsessy i apparaty, Omsk, OAO " Tekhuglerod, 2004, pp. 8, 22, 25, 54, 56, 65.
Tkachev A. G., Zolotukhin I. V., Apparatura i metody sinteza tverdotelnykh nanostruktur, Moscow, Izdatelstvo Mashinostroenie-1, 2007, pp. 25, 27.

* cited by examiner

*Primary Examiner* — Stuart Hendrickson
(74) *Attorney, Agent, or Firm* — Bardmesser Law Group

(57) ABSTRACT

A method for producing nanostructured carbon material, including (a) combusting hydrocarbon fuel in an oxygen-enriched environment to produce combustion products having a temperature of 1,000-3,150° C.; (b) forming a post-combustion gas stream having a velocity of 40-800 m/s; (c) forming a working mixture by introducing hydrocarbon feedstock and a catalyst precursor for carbon nanostructures growth into the postcombustion gas stream; (d) introducing the working mixture into a reaction zone, wherein the reaction zone is maintained at a temperature of 900-2,300° C., and wherein the catalyst precursor is decomposed into catalyst particles, while the hydrocarbon feedstock is decomposed to form carbon nanostructures and gaseous products; and (e) separating carbon nanostructures from the gaseous products of the decomposition of hydrocarbon feedstock.

19 Claims, 1 Drawing Sheet

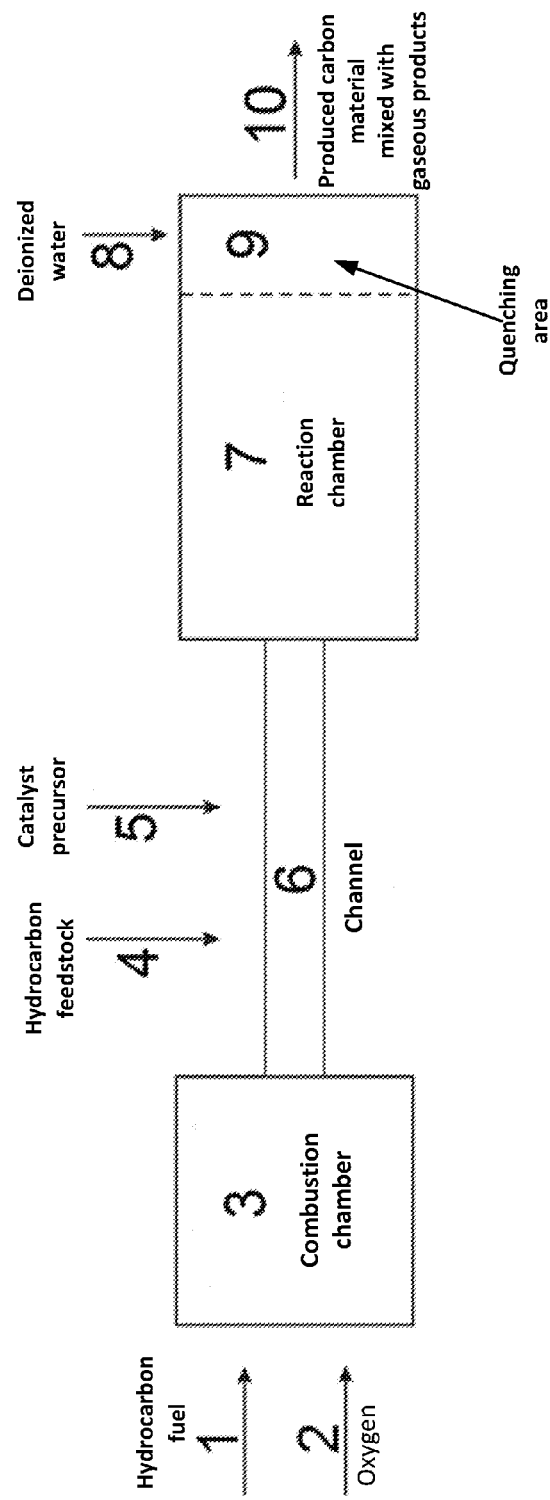

METHOD FOR PRODUCING NANOSTRUCTURED CARBON MATERIAL BASED ON CARBON BLACK

CROSS-REFERENCE TO RELATED APPLICATIONS

This application is a U.S. National Phase of PCT/RU2014/000070, filed on Jan. 29, 2014.

BACKGROUND OF THE INVENTION

Technical Field

The invention relates to technologies for producing nanostructured carbon material containing mainly carbon black combined with other carbon nanostructures such as nanotubes, nanofibers, fullerenes, onion-like structures, etc.

Description of the Related Art

Nanostructured carbon material is a mixture of micron and submicron carbon particles, such as carbon black, carbon nanotubes and nanofibers, fullerenes, onion-like structures, etc. In nanostructured carbon material based on carbon black, the latter predominates in terms of its content relative to other nanostructures contained in the material.

Here, the term "carbon nanostructures" is used to represent both carbon black particles and nanotubes, nanofibers, fullerenes, onions, and similar nanostructures.

Carbon black is widely used as a filler for polymers and rubbers that ensures improvement in their properties. However, an increase in the content of carbon black only yields a positive effect up to a certain limit.

The properties of polymers and rubbers can be considerably improved beyond this limit due to a small amount (approximately 1%) of elongated carbon nanostructures, such as nanofibers and nanotubes, included in the filler. Thus, introducing small amounts of carbon nanotubes into the polymer matrix improves such mechanical properties of a polymer as stiffness, impact elasticity, and strength. Application of carbon nanotubes mixed with carbon black or without it as the filler for tires affects the performance characteristics of a tire protector by increasing its wear resistance, rolling resistance, and tear strength.

High production cost and, as a result, high prices are the factors that prevent carbon nanotubes from being used as additives to the fillers of polymers and rubbers.

At the same time, there is a pressing need for an inexpensive and high-yield method for synthesis of large amounts of nanostructured carbon material that comprises elongated carbon nanostructures. For this reason, a challenge exists for creating a technology of producing nanostructured carbon material comprising nanotubes and/or nanofibers and other nanostructures.

The industrial production of carbon black, which is the most widely used nanostructured carbon material, is performed in special furnaces or chemical reactors by thermal decomposition of hydrocarbon feedstock in a turbulent stream.

There is a known method of producing carbon black by the thermal decomposition of natural gas or other methane-based hydrocarbon gases in regenerative gas heaters, see U.S. Pat. No. 3,445,190. The disadvantages of this method are low yield of carbon black, its contamination with mineral impurities, low electric conductivity of the produced carbon black and high consumption of energy resources for pyrolysis.

There is a known method of producing carbon black comprising the combustion of fuel with air, a supply of an axial flow of hydrocarbon feedstock and two coaxial flows of oxygen-containing gas, thermal decomposition of feedstock in the fuel combustion products to form gas-and-soot products, their thermal treatment at 1,450-1,550° C. for 0.2-0.5 s, subsequent cooling to 800-1,100° C. with water, and activation of the soot surface for 0.1-0.5 s, as well as quenching to 600-700° C. and separation of carbon black from gas products, see RU Patent No. 2116325. The disadvantage of this method is low quality of the produced carbon black, which necessitates its introduction as the filler of polymers and rubbers in high concentrations.

There is a known method of producing carbon black with good electrically conductive properties. The method comprises supplying a raw material mixture containing acetylene, hydrocarbons, and catalyst for carbon nanotubes formation into the high-temperature zone (with a temperature being equal or higher than the temperature of hydrocarbon thermal decomposition), and subsequent thermal treatment of the mixture, see U.S. Pat. No. 8,114,937. The produced material is composed by areas in the form of chains of spherical carbon particles connected with areas of rod-shaped carbon particles. The disadvantage of this method is the necessity of using expensive acetylene as the feedstock for producing carbon black, which increases considerably the expense of producing the product.

There is a known method of producing nanostructured carbon material based on carbon black by growing carbon nanotubes on the surface of prepared carbon black, see U.S. Publication No. 2008/0233402. This method is implemented by depositing a catalyst precursor onto the preliminarily produced carbon black, its subsequent conversion into a suitable catalyst for carbon nanotubes growth and heating in the presence of a carbon-containing gas up to 300-1,200° C. As this takes place, carbon nanotubes are grown on the surface of carbon black. The final stage is the cooling of the nanostructured carbon product produced by this method. This method of producing carbon material does not allow reproducing a carbon product with the same morphological composition including dimensions of carbon nanostructures, the ratio between the content of carbon black and carbon nanotubes, and, accordingly, with the same properties, such as electric conductivity, due to the fact that carbon nanotubes growth takes place on the surface of catalyst particles, which are formed on the surface of carbon black in the course of recovery of the catalyst precursor applied onto the surface of carbon black.

SUMMARY OF THE INVENTION

The invention solves the task of producing uniform nanostructured carbon material comprising both spherical-type carbon structures, predominantly carbon black particles, and elongated carbon nanostructures, such as filamentary nanofibers, single-wall and multi-wall nanotubes, the morphology of which, namely, the length, typical diameter, surface, internal structure, and the proportion in the produced carbon material are determined by the synthesis conditions.

A method for producing nanostructured carbon material includes (a) combusting hydrocarbon fuel in an oxygen-enriched environment to produce combustion products having a temperature of 1,000-3,150° C.; (b) forming a post-combustion gas stream having a velocity of 40-800 m/s; (c) forming a working mixture by introducing hydrocarbon feedstock and a catalyst precursor for carbon nanostructures growth into the postcombustion gas stream; (d) introducing the working mixture into a reaction zone, wherein the reaction zone is maintained at a temperature of 900-2,300°

C., and wherein the catalyst precursor is decomposed into catalyst particles, while the hydrocarbon feedstock is decomposed to form carbon nanostructures and gaseous products; and (e) separating carbon nanostructures from the gaseous products of the decomposition of hydrocarbon feedstock.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIG. 1 shows a method implementation diagram, according to one embodiment of the invention.

DETAILED DESCRIPTION OF EMBODIMENTS OF THE INVENTION

Reference will now be made in detail to the embodiments of the present invention, examples of which are illustrated in the accompanying drawings.

The invention solves the task of producing uniform nanostructured carbon material comprising both spherical-type carbon structures, predominantly carbon black particles, and elongated carbon nanostructures, such as filamentary nanofibers, single-wall and multi-wall nanotubes, the morphology of which, namely, the length, typical diameter, surface, internal structure, and the proportion in the produced carbon material are determined by the synthesis conditions.

A method for producing nanostructured carbon material based on carbon black includes the following stages:

(a) combusting hydrocarbon fuel in an oxygen-enriched environment to produce combustion products having a temperature of 1,000-3,150° C.;

(b) forming a postcombustion gas stream with a velocity of 40-800 m/s;

(c) forming the working mixture by introduction of hydrocarbon feedstock and a catalyst precursor for carbon nanostructures growth into the postcombustion gas stream;

(d) introducing the working mixture into a reaction zone, where a temperature of 900-2,300° C. is maintained, and where the catalyst precursor for carbon nanostructures growth is decomposed in to catalyst particles, while hydrocarbon feedstock is decomposed to form carbon nanostructures and gaseous products; and (e) separating carbon the nanostructures from the gaseous products of the decomposition of hydrocarbon feedstock.

Hydrocarbons from the following series can be used as hydrocarbon fuel: methane, ethane, propane, butane, pentane, or a mixture thereof.

Hydrocarbon fuel can be supplied for combustion with carbon monoxide, hydrogen, or gaseous products of the decomposition of hydrocarbon feedstock or a mixture thereof.

Oxygen can be supplied for combustion in pure form or as a part of air or along with process gas from the following series: inert gas, nitrogen, carbon dioxide, or a mixture thereof.

Hydrocarbon fuel is combusted in the combustion chamber, while the postcombustion gas stream is formed in a channel where combustion products are supplied from the combustion chamber, and which has a smaller cross section relative to the cross section of the combustion chamber.

The reaction zone is located in the reaction chamber.

The combustion of hydrocarbon fuel can be performed in case of oxygen deficiency.

Before the combustion, the oxygen-containing mixture can be heated up to the temperature equal to or less than 600° C. and mixed with the hydrocarbon fuel.

Any kind of feedstock that is used to produce carbon black can be used as hydrocarbon feedstock. The feedstock can be liquid at ordinary temperatures, however, this is not necessary, and high molecular weight hydrocarbons that become liquid upon heating can be used as well. In general, hydrocarbon feedstock containing aromatic, naphthenic, paraffinic components, or a mixture thereof, preferably aromatic hydrocarbons, can be used as feedstock. For example, the following substances can be used as feedstock: anthracene oil, catalytic gas oil, pyrolysis resin, pitch distillate, or mixtures thereof or other similar substances.

Chemical compounds comprising a transition metal from group 8 of the periodic table, namely one or more of iron, cobalt, nickel, ruthenium, rhodium, palladium, osmium, iridium and platinum, can be used as a catalyst precursor. These metal-containing compounds are soluble in hydrocarbon feedstock or capable of creating colloidal solutions therein. For example, metallic stearates can form stable colloidal solutions in aromatic hydrocarbons.

Also, metal-containing compounds should have a decomposition temperature which is lower than the synthesis reactor temperature, while the metal included in the catalyst precursor should be among the products of catalyst precursor thermal decomposition in a gaseous atmosphere of fuel combustion products. The catalyst precursor can comprise atoms of different metals, but at least one of them, as mentioned above, should be from group 8 of the periodic table. For example, ferrocene, nickelocene, cobaltocene, ferric nitrate, ferric acetate, ferric sulphate, ferric chloride, ferric carbonyls, or a mixture thereof can be used as a catalyst precursor.

The residence time of the working mixture in the reaction zone is 0.01-2 s. The lower time limit is determined by kinetic processes of the formation of carbon nanostructures, such as, for example, carbon nanotubes. The upper time limit determines the morphology of products: as residence time increases, the average size of carbon black particles and the length and diameter of fibrous carbon nanostructures increase as well.

The produced mixture of carbon nanostructures and gaseous products of the decomposition of hydrocarbon feedstock can undergo quenching, for example, by injecting deionized water into the reaction chamber.

Nanostructured carbon material can be separated from the gaseous products of the decomposition of hydrocarbons by filtering.

Additionally, the catalyst precursor can be supplied to the reaction chamber, which is appropriate when it is necessary to increase the proportion of fibrous carbon nanostructures with small diameter fibers in the resulting product.

It is also expedient to premix the catalyst precursor for carbon nanostructures growth and hydrocarbon feedstock before their introduction into the postcombustion gas stream.

Carbon nanotubes or their nucleating seeds can be supplied to the reaction chamber separately.

The catalyst precursor for carbon nanostructures growth can be supplied to the combustion chamber separately.

The working mixture can contain at least 35 weight parts of hydrocarbon feedstock per one weight part of the catalyst precursor.

The working mixture can be supplied to the reaction chamber in such a way that the flow rate of hydrocarbon feedstock is not more than 9,000 kg/h.

FIG. 1 shows the method implementation diagram, wherein 1 is hydrocarbon fuel, 2 is oxygen, 3 is the combustion chamber, 4 is hydrocarbon feedstock, 5 is the catalyst precursor for carbon nanostructures growth, 6 is the channel, 7 is the reaction chamber, 8 is deionized water, 9 is the quenching area, and 10 the produced carbon material mixed with gaseous products.

The method is implemented as follows.

Hydrocarbon fuel (1) is supplied to the combustion chamber (3). This can be methane, ethane, propane, butane, pentane, or a mixture thereof. Also, oxygen 2 in pure form, as a part of air, or along with process gas is supplied to the combustion chamber. The hydrocarbon fuel and oxygen can be supplied separately or can be premixed in the mixing chamber. The oxygen-containing mixture can be preliminarily heated in order to increase energy efficiency, but preferably not more than up to 600° C.

Hydrocarbon fuel is combusted in the combustion chamber (3) to produce the high-temperature gas flow with a temperature of 1,000-3,150° C. The morphology and properties of the resulting carbon product depend on the flow gas composition and temperature. Hydrocarbon fuel can be supplied for combustion together with carbon monoxide, hydrogen, gaseous products of decomposition, or a mixture thereof in order to control the properties of the produced carbon nanostructures, such as dispersity, homogeneity, dimensions of nanostructures, thermodynamic properties, etc. Varying the composition and temperature of the gas flow can affect the product morphological composition. In particular, introducing hydrocarbon feedstock into the gas flow with a high content of carbon monoxide and hydrogen results in a substantial increase in the formation rate of the polycondensation centers of hydrocarbons during the initial stage of the process, which eventually increases the formation rate of carbon nanostructures. The speedup of the initial formation stage of polycondensation centers results in the improvement of such characteristics of carbon nanostructures as dispersity and homogeneity.

The combustion products are removed from the combustion chamber through the channel (6) connecting the combustion chamber (3) to the reaction chamber (7). The channel diameter is smaller than the combustion chamber diameter, which entails the formation of the postcombustion gas stream with the velocity of 40-800 m/s.

The working mixture for the reaction chamber is formed in the channel (6). Hydrocarbon feedstock (4) and the catalyst precursor (5) for carbon nanostructures growth are fed into the postcombustion gas stream to produce the working mixture. To this end, the nozzles that ensure the spraying of the reagents are installed in the channel. As a result, fragmentation into small parts and intense evaporation of feedstock drops occur in the channel.

Hydrocarbon feedstock (4), which can be anthracene oil, catalytic gas oil, pyrolysis resin, pitch distillate, or other suitable feedstock, is sprayed into the channel by nozzles.

Further, the catalyst precursor (5) that can be a metallocene of the iron subgroup or another suitable substance is sprayed into the channel through other nozzles installed opposite one another at an equal distance from the beginning of the channel, which can be located both upstream and downstream of the feedstock nozzles.

Hydrocarbon feedstock and the catalyst precursor can be supplied to the postcombustion gas stream simultaneously. In this case, they should be premixed with each other.

When forming the working mixture, it is appropriate to maintain the following relations: one weight part of the catalyst precursor is accounted for by at least 80 weight parts of hydrocarbon feedstock, if air is supplied for combustion, or one weight part of the catalyst precursor is accounted for by at least 35 weight parts of hydrocarbon feedstock, if oxygen is supplied for combustion.

By introducing hydrocarbon feedstock and the catalyst precursor into the high-velocity postcombustion gas stream, a working reaction mixture having a temperature of 900-2,400° C. is produced. The reaction mixture is supplied into the reaction chamber (7), where a temperature of 900-2,300° C. is maintained. Upon entering the high-temperature gas flow, the catalyst precursor is decomposed within the reaction chamber to form metal atoms that are subsequently condensed into catalyst particles.

Thus, metal nanoparticles, predominantly of at least 1 nm in size, are a catalyst for carbon nanostructures (including carbon nanotubes) growth. The size of nanoparticles depends on the temperature in the reaction chamber and on the residence time of the reaction mixture therein.

A graphene layer of carbon released during the decomposition of hydrocarbon feedstock forms on the surface of a catalyst nanoparticle, which results in generation of a so-called "nucleating seed." The nucleating seed becomes the center for the further growth of carbon nanostructures, including nanotubes. It is a metal nanoparticle of the catalyst with a "cap" or a hemi-sphere composed of carbon atoms. The presence of nucleating seeds within the reactor leads to synthesis of carbon nanostructures including fibers and nanotubes. Simultaneously, the high-temperature decomposition of hydrocarbons to form carbon black proceeds in the reaction chamber at the temperature. Depending on the morphological composition of produced carbon nanostructures, nucleating seeds are synthesized either in the same volume of the reaction chamber where the decomposition of hydrocarbon feedstock takes place or in another reaction chamber volume, adjacent to the reactor.

Thus, the following processes occur simultaneously in the reaction chamber: decomposition of hydrocarbon feedstock, formation of catalyst nanoparticles from the catalyst precursor, formation of fibrous nanostructures, including carbon nanotubes, or other nanostructures, and formation of carbon black.

The duration of the stay of the working mixture in the reaction zone is 0.01-2 s.

The production of nanostructured carbon material containing carbon black particles, carbon nanotubes, nanofibers, and other carbon nanostructures in the reaction chamber is followed by quenching. For this purpose, the quenching area (9), where deionized water (8) is sprayed, is provided at the end of the reaction chamber. As the water enters the chamber, the temperature is rapidly reduced to 600-800° C., which prevents the produced carbon nanostructures from burning out via gasification reactions. The produced solid carbon structures (10) with gaseous products of decomposition are removed from the reaction chamber and separated into solid and gaseous fractions by filtering. The resulting material is a mixture of various carbon nanostructures.

The proposed method allows obtaining a homogeneous product with spherical and elongated carbon nanostructures uniformly distributed therein, which cannot be achieved by just mixing the carbon nanostructures synthesized separately.

Its special feature is obtaining nanostructures in the gas phase on floating catalyst nanoparticles. The produced material contains carbon nanomaterials having the predetermined structure including: carbon black particles, carbon nanofibers with possible inclusions of single-wall and multi-wall nanotubes. The morphology of these particles, namely: the length, typical thickness, surface, and internal structure, as well as the proportion in the produced carbon material are determined by the synthesis conditions. For this purpose, efficient process conditions are selected, including the temperature, flow rate, and composition of the working mixture.

This method does not have any limitations on the scaling of the processing line and provides the possibility of producing nanostructured carbon material on an industrial scale. It allows establishing the continuous production of carbon material containing the carbon nanostructures including nanotubes with the flow rate of hydrocarbon feedstock up to 9,000 kg/h.

INDUSTRIAL APPLICABILITY

The method for producing nanostructured carbon material based on carbon black can be used in various industries—in particular, in chemical, electrical engineering, machine-building, and other industries, while the product obtained with this technology can be used to improve the performance properties of polymers or rubbers as a filler, as a pigment for printing paints, for the manufacture of certain alloys, special paper grades, and electrocarbon products such as electrodes and galvanic cells.

EMBODIMENTS OF THE INVENTION

Example 1

Oxygen with the flow rate of 38 $m^3$/h and methane as the hydrocarbon fuel with the flow rate of 50 $m^3$/h are supplied into the combustion chamber. Methane is combusted in the combustion chamber. As this takes place, a stream of gases produced as a result of methane combustion, with the average temperature of 1,600° C., forms in the chamber. The combustion products are passed from the combustion chamber through a confuser forming the gas stream with the average velocity of 200 m/s and a temperature of 1,600° C.

Anthracene oil as the feedstock, premixed with ferrocene as the catalyst precursor, is sprayed into the high-velocity gas stream through nozzles. The concentration of ferrocene is 0.6% wt, the temperature of the feedstock is 200° C., and the flow rate is 8 kg/h.

The resulting working mixture comprised of the catalyst precursor for carbon nanostructures growth, hydrocarbon feedstock, and hydrocarbon fuel combustion products enters the reaction chamber, where a temperature of 1,500° C. is established.

The catalyst precursor in the reaction chamber is decomposed due to high temperatures to form iron nanoclusters as catalyst particles. Simultaneously, a portion of hydrocarbon feedstock is decomposed due to high temperatures to initiate the growth of elongated carbon nanostructures on the surface of catalyst particles, while another portion of hydrocarbon feedstock is decomposed to form carbon black.

After this, quenching is carried out as follows: deionized water having a temperature of 27° C. and a flow rate of 35 kg/h is sprayed into the reaction chamber. This causes a rapid decrease in temperature of the carbon-gas mixture to 800° C.

The resulting nanostructures with gaseous products of decomposition are removed from the reaction chamber and separated from gas by filtering.

The resulting carbon material contains at least 95% of carbon black particles of up to 60 nm, 3% of carbon nanotube bundles with a typical diameter from 8 nm to 20 nm and 2% of carbon nanofibers with a diameter up to 300 nm.

Example 2

Natural gas as hydrocarbon fuel with the flow rate of 10 $m^3$/h and air with the flow rate of 130 $m^3$/h are supplied into the combustion chamber. Natural gas is combusted in the combustion chamber, and, as this takes place, a stream of gases produced as a result of natural gas combustion, with the average temperature of 1,600° C., forms in the chamber. The combustion products are passed from the chamber through a confuser forming a high-velocity gas stream with an average velocity of 200 m/s and temperature of 1,600° C.

Anthracene oil as the feedstock, premixed with ferrocene as the catalyst precursor, is sprayed into the high-velocity stream through nozzles. The concentration of ferrocene is 0.6% wt, the temperature of the feedstock is 200° C., and the flow rate is 17 kg/h.

The resulting working mixture comprised of hydrocarbon fuel combustion products, feedstock, and the catalyst precursor for carbon nanostructures growth enters the reaction chamber, where a temperature of 1,500° C. is established.

The catalyst precursor in the reaction chamber is decomposed to form iron nanoclusters as catalyst particles. Simultaneously, a portion of hydrocarbon feedstock is decomposed under the action of high temperatures to initiate the growth of elongated carbon nanostructures on the surface of catalyst particles, while another portion of hydrocarbon feedstock is decomposed to form carbon black.

After this, quenching is carried out, for which purpose water having a temperature of 27° C. and a flow rate of 40 kg/h is sprayed into the reaction chamber. This causes a rapid decrease in temperature of the carbon-gas mixture to 800° C. The resulting nanostructures with gaseous products of decomposition are removed from the reaction chamber and separated from gas by filtering. The resulting carbon material contains at least 90% of carbon black particles of up to 100 nm, 7% of carbon nanotube bundles with a typical diameter from 8 nm to 20 nm and 3% of carbon nanofibers with a diameter up to 300 nm.

Having thus described the different embodiments of a system and method, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A method for producing nanostructured carbon material, the method comprising:
    (a) combusting hydrocarbon fuel in an oxygen-enriched environment to produce combustion products having a temperature of 1,000-3,150° C.;
    (b) forming a postcombustion gas stream having a velocity of 40-800 m/s;
    (c) forming a working mixture by introducing hydrocarbon feedstock and a catalyst precursor for growth of carbon nanostructures into the postcombustion gas stream;
    (d) introducing the working mixture into a reaction zone, wherein the reaction zone is maintained at a temperature of 1000-2,300° C., and wherein the catalyst precursor is decomposed into catalyst particles, comprising at least some catalyst particles of 1 nm diameter having a graphene layer on their surface, while the hydrocarbon feedstock is decomposed to form the carbon nanostructures and gaseous products; and
    (e) separating the carbon nanostructures from the gaseous products of the decomposition of the hydrocarbon feedstock,
    wherein the carbon nanostructures include carbon nanotubes and carbon nanofibers.

2. The method of claim 1, wherein the hydrocarbon fuel is any of methane, ethane, propane, butane, pentane, and a mixture thereof.

3. The method of claim 1, wherein hydrocarbon fuel is supplied together with carbon monoxide, hydrogen, the gaseous products of the decomposition of the hydrocarbon feedstock, or a mixture thereof.

4. The method of claim 1, wherein oxygen is supplied for combustion in pure form or as part of air or together with process gas selected from the following: inert gas, nitrogen, carbon dioxide, or a mixture thereof.

5. The method of claim 1, wherein the hydrocarbon fuel is combusted in a combustion chamber, while the postcombustion flow is formed in a channel, wherein the combustion products are supplied from the combustion chamber and wherein the channel has a smaller cross section than a cross section of the combustion chamber.

6. The method of claim 1, wherein the hydrocarbon feedstock includes aromatic, naphthenic, paraffinic components, or a mixture thereof.

7. The method of claim 1, wherein the catalyst precursor includes a transition metal from group 8 of the periodic table.

8. The method of claim 1, wherein the catalyst precursor includes iron.

9. The method of claim 1, wherein the reaction zone is located in a reaction chamber.

10. The method of claim 1, wherein a residence time of the working mixture in the reaction chamber is 0.01-2 sec.

11. The method of claim 1, wherein the carbon nanostructures and the gaseous products of the decomposition of the hydrocarbon feedstock undergo water quenching.

12. The method of claim 1, wherein the carbon nanostructures are separated from the gaseous products of the decomposition of the hydrocarbon feedstock by filtering.

13. The method of claim 1, wherein the catalyst precursor for the growth of the carbon nanostructures is supplied to the reaction zone.

14. The method of claim 1, wherein the catalyst precursor for the growth of the carbon nanostructures and the hydrocarbon feedstock are premixed before their introduction into the postcombustion gas stream.

15. The method of claim 1, wherein the combustion of the hydrocarbon fuel is performed under condition of oxygen deficiency.

16. The method of claim 1, wherein the carbon nanotubes and carbon nanofibers and/or their nucleating seeds are supplied to the reaction zone.

17. The method of claim 1, wherein the catalyst precursor for the growth of the carbon nanostructures is supplied to the combustion chamber during the combustion of hydrocarbon fuel.

18. The method of claim 1, wherein the working mixture contains at least 35 weight parts of the hydrocarbon feedstock per one weight part of the catalyst precursor.

19. The method of claim 1, wherein the working mixture is supplied to the reaction zone with a flow rate of the hydrocarbon feedstock of up to 9,000 kg/h.

\* \* \* \* \*